(12) United States Patent
Logel et al.

(10) Patent No.: US 9,149,785 B2
(45) Date of Patent: Oct. 6, 2015

(54) HYDRATED HUMIDITY CONTROL SUBSTANCE AND PROCESS FOR ITS PREPARATION

(75) Inventors: Valere Logel, Levallois Perret (FR); Etienne Lemasle, Paris (FR)

(73) Assignee: Clariant Production (France) S.A.S., Trosly Breuil (FR)

(*) Notice: Subject to any disclaimer, the term of this patent is extended or adjusted under 35 U.S.C. 154(b) by 330 days.

(21) Appl. No.: 12/830,607

(22) Filed: Jul. 6, 2010

(65) Prior Publication Data

US 2011/0017615 A1    Jan. 27, 2011

(30) Foreign Application Priority Data

Jul. 23, 2009 (EP) .................................. 09166207

(51) Int. Cl.
  *B01J 20/12* (2006.01)
  *B01D 53/26* (2006.01)
  *B01J 20/10* (2006.01)

(52) U.S. Cl.
  CPC ............... *B01J 20/12* (2013.01); *B01D 53/261* (2013.01); *B01J 20/103* (2013.01); *B01D 2253/106* (2013.01)

(58) Field of Classification Search
  CPC .................................. B01D 53/26; B01J 20/12
  USPC ......................................................... 252/194
  See application file for complete search history.

(56) References Cited

U.S. PATENT DOCUMENTS

| | | |
|---|---|---|
| 2,120,281 A | 6/1938 | Hunt |
| 2,582,254 A | 1/1952 | Hunter |
| 2,853,454 A | 9/1958 | Mills |
| 3,186,794 A | 6/1965 | Davies |
| 3,579,464 A | 5/1971 | Rosen et al. |
| 4,346,071 A | 8/1982 | Dent et al. |
| 4,395,357 A | 7/1983 | Kramer et al. |
| 4,435,025 A | 3/1984 | Weintraub |
| 4,535,004 A | 8/1985 | Haas et al. |
| 4,535,005 A | 8/1985 | Haas et al. |
| 4,781,864 A | 11/1988 | Pryor et al. |
| 5,298,473 A | 3/1994 | Pinnavaia et al. |
| 5,342,597 A | 8/1994 | Tunison, III |
| 5,897,888 A | 4/1999 | Campion et al. |
| 2006/0144733 A1 | 7/2006 | Wu et al. |
| 2007/0228072 A1 | 10/2007 | Foust et al. |
| 2008/0017528 A1 | 1/2008 | Magargee et al. |
| 2010/0189780 A1 | 7/2010 | Walz et al. |
| 2011/0036733 A1 | 2/2011 | Balthes et al. |

FOREIGN PATENT DOCUMENTS

| | | |
|---|---|---|
| DE | 3603094 A1 | 8/1987 |
| DE | 4203800 A1 | 8/1992 |
| DE | 4331612 A1 | 3/1995 |
| DE | 102007016937 A1 | 10/2008 |
| EP | 0111878 A2 | 6/1984 |
| EP | 0553796 B1 | 3/1997 |
| EP | 1745845 | 1/2007 |
| EP | 1745845 A1 | 1/2007 |
| GB | 736886 | 9/1955 |
| GB | 1070216 A | 6/1967 |
| GB | 1334240 | 10/1973 |
| GB | 2039707 A | 8/1980 |
| WO | 9415709 | 7/1994 |
| WO | 0061493 | 10/2000 |
| WO | 0065339 A1 | 11/2000 |
| WO | 0072966 A1 | 12/2000 |
| WO | 2004083849 A1 | 9/2004 |
| WO | 2006130029 A2 | 12/2006 |
| WO | 2007002247 A2 | 1/2007 |
| WO | 2007098469 A2 | 8/2007 |
| WO | 2008115812 A2 | 9/2008 |
| WO | 2008135570 | 11/2008 |
| WO | 2008135570 A1 | 11/2008 |
| WO | WO 2009013243 A1 * | 1/2009 |

OTHER PUBLICATIONS

Extended European Search Report for EPO Application No. 09166207.2-1218.

(Continued)

*Primary Examiner* — Peter F Godenschwager

(74) *Attorney, Agent, or Firm* — Anthony A. Bisulca

(57) ABSTRACT

The present invention relates to a process for preparing a hydrated moisture control substance comprising the steps:

(i) providing a predetermined amount by weight of humidity control substance having a moisture content lower than the moisture content desired with respect to the relative humidity of the atmosphere to be established and/or maintained within a sealable packaging material, (ii) determining the amount of water necessary in order to impart the desired moisture content to the humidity control substance, (iii) introducing said predetermined amount of the humidity control substance into a mixing apparatus, (iv) introducing said amount of water into the mixing apparatus under mixing and allowing the humidity control substance to adsorb the water to form the hydrated humidity control substance.

The present invention also relates to a hydrated humidity control substance obtainable by said process and to a container comprising said hydrated humidity control substance and a pharmaceutical or diagnostic product.

12 Claims, 1 Drawing Sheet

(56) References Cited

OTHER PUBLICATIONS

Brill, Robert H., "The use of equilibrated silica gel for the protection of glass with incipient crizzling," The Journal of Glass Studies, vol. 20 (1978): 100-118.

Thomson, Garry, "Stabilization of RH in exhibition cases: hygrometric half-time," Studies in Conservation, vol. 22 (1977): 85-102.

Weintraub, Steven, "Demystifying Silica Gel," Object Specialty Group Postprints, vol. 9 (2002), Washington, D.C., American Institute for Conservation.

"Mesh (scale)," http://en.wikipedia.org/wiki/Mesh_(scale), accessed Nov. 19, 2012.

"Mixing (process engineering)," http://en.wikipedia.org./w/index.php?title=Mixing_(process_engineering)&printable=yes, accessed Oct. 23, 2012.

Gerhartz, Wolfgang, Ed., Chapter 24, "Mixing, Introduction," Chapter 25, "Stirring," and Chapter 27, "Mixing of Solids," Ullmann's Encyclopedia of Industrial Chemistry, vol. B2, VCH Verlagsgesellschaft mbH, D-6940 Weinheim (Federal Republic of Germany), 1988.

Bowen, Paul, "Particle size distribution measurement from millimeters to nanometers and from rods to platelets," Journal of Dispersion Science and Technology, vol. 23, No. 5 (2002): 631-662.

English translation of Opposition, dated Nov. 21, 2012, against European Patent 2,277,799 B1 filed in the name of and on behalf of Angele Lefevre. The EPO Communication of a Notice of Opposition was provided to the Applicant on Nov. 29, 2012.

Opposition, dated Nov. 20, 2012, against European Patent 2,277,799 B1 filed in the name of and on behalf of Sanner GmbH. The EPO Communication of a Notice of Opposition was provided to the Applicant on Nov. 28, 2012 (an English translation of this document is not currently available, but will be provided as soon as it becomes available).

* cited by examiner

HYDRATED HUMIDITY CONTROL SUBSTANCE AND PROCESS FOR ITS PREPARATION

CROSS-REFERENCE TO RELATED APPLICATIONS

None

TECHNICAL FIELD

The present invention relates to a process for the preparation of a humidity control substance hydrated to a predetermined level and to a hydrated humidity control substance obtainable by said process.

BACKGROUND OF THE INVENTION

Moisture sensitive materials, such as pharmaceutical products, are often stored and shipped in water-proof resealable containers. When these containers are opened in order to access the products, the air that is present inside the container and outside of the container mix which often results in a change in the relative humidity of the air within the container. The container and its cap may also be permeable to air over extended periods of time. In addition, there may be changes in the relative humidity level within the container, if there is a leak in the container.

These changes in the relative humidity level within a container may adversely affect the products which are stored within the container. It is often important to maintain an essentially constant relative humidity level within the container or within larger shipping packages holding multiple containers or even in storage rooms for the containers.

To prevent excessively high relative humidity levels from adversely affecting products, manufacturers commonly place desiccants within a container or with shipping packages for multiple containers to adsorb excess moisture from the air that enters the container. Conventional desiccants include silica gel, clay, molecular sieves, etc. Desiccants used in this manner reduce the level of moisture within the container to a relatively low level, based on the moisture absorption capability of the desiccant that is chosen.

However, in order to avoid deterioration of the stored goods, it is in many cases necessary to maintain a relative humidity within the container that is higher than would be achieved from the use of conventional desiccants in a "dry" state i.e. in a state in which essentially no water has been adsorbed.

This has been especially important for products which retain significant quantities of moisture, such as vegetables, flowers or tobacco products. Thus, humectant materials have been used to maintain a predetermined hydration level within a container. For instance, moistened pads have been used to assist in the maintenance of high humidity within such containers.

The disadvantage related to such moistened pads is that they readily act as humectants, i.e. moisture is readily desorbed or vaporized, but moisture is scarcely re-adsorbed in order to compensate for moisture released either from the stored goods or intruding into the container from the exterior, i.e. they scarcely act as desiccants. Thus, it is difficult to remove excess moisture from the atmosphere within a storage container. Furthermore, the surface of such moistened pads can represent a medium for the growth of microorganisms such as various bacteria, fungi, moulds, yeasts etc., the presence of which is usually not desirable, in particular when storing goods such as vegetables, flowers or tobacco products. In particular in the storage of goods that are intended for contact with human beings such as the aforementioned goods, the use of possibly hazardous agents for controlling proliferation of microorganisms is to be avoided.

Recently, it has been found that conventional desiccant materials, such as silica gel, molecular sieves and the like, can be hydrated to specific hydration levels. This means that water can be adsorbed to a level between the "dry" state (in which essentially no water has been adsorbed) and the saturation state (in which no further moisture is adsorbed from the environment). When these hydrated desiccant materials are placed within a sealed container or room, the relative humidity level of the environment within that container or room can be maintained at a higher predetermined relative humidity level.

Thus, the hydrated desiccant material can adsorb moisture from the surrounding atmosphere, when the relative humidity is higher than the desired level. Hence, in this case, the material acts as a desiccant. Furthermore, the hydrated desiccant material can also release moisture to the surrounding atmosphere, when the relative humidity is lower than the desired level. Hence, the hydrated humidity control substance can also act as humectant. In view of these properties, such hydrated desiccant materials are also referred to as humidity control substances.

In the context of the present application, the word "adsorb" is used in order to indicate that moisture is taken up from the surrounding atmosphere regardless of the underlying process. Any physisorption and chemisorption processes shall be included.

The conventional procedure used for hydrating desiccant products is to place those products in a constant humidity environment, such as a sealed room or oven, wherein the humidity of the environment surrounding the desiccant products to be hydrated is preset and maintained at the desired humidity level.

US 2006/0144733 A1 and US 2007/0228072 A1 describe containers for retaining moisture sensitive material. Said containers are provided with a humidity control-substance such as clay, silica gel and molecular sieve. In order to provide a humidity control substance having a moisture content sufficient for establishing and/or maintaining a desired humidity within said container, a humidity control substance having a moisture content lower than desired is hydrated by introducing the humidity control substance into a chamber providing an environment controlled with respect to humidity and allowing the humidity control substance to adsorb moisture from said environment.

In order to achieve the desired hydration levels, the desiccant products must be left in the constant humidity environment for a long period of time. Depending on the amount of desiccant to be treated and the desired level of hydration, this process can be quite slow and can take from several hours to several days. Furthermore, all of the desiccant products to be hydrated must be physically exposed to the humidity in the surrounding atmosphere in order to adsorb sufficient humidity such that the desired hydration level is achieved. This requires relatively thin layers of the desiccant product to be placed within the constant humidity environment and frequent mixing of the desiccant product so that the entire quantity of desiccant products can be hydrated. Otherwise, the moisture content of the hydrated desiccant product can be heterogeneous and the accuracy of the relative humidity established by the hydrated desiccant product can be insufficiently low. In addition, the relative humidity level within the room must be carefully monitored so that the desired hydration level of the desiccant products is achieved, regardless of the quantity of the desiccant products that are placed within that room. In addition, the energy costs associated with hydration of large quantities of humidity control substance using these sealed rooms can be substantial.

Accordingly, a process for the hydration of desiccant materials devoid of the above-mentioned disadvantages is desirable.

It is hence an object of the present invention to provide a process that allows the rapid and reliable preparation of hydrated humidity control substances and hence is suitable for the preparation of large quantities of hydrated humidity control substance in a time-efficient manner.

DESCRIPTION OF THE INVENTION

Surprisingly, it was found that the above-mentioned object can be accomplished by means of a process comprising the following steps:
(i) providing an predetermined amount by weight of starting humidity control substance having a moisture content lower than the moisture content desired with respect to the relative humidity of the atmosphere to be established and/or maintained within a sealable packaging material,
(ii) determining the amount of water necessary in order to impart the desired moisture content of the humidity control substance by using the correlation between the equilibrium moisture content of said humidity control substance and the relative humidity of the surrounding atmosphere,
(iii) introducing said predetermined amount of starting humidity control substance into a mixing apparatus,
(iv) introducing at least a portion of said amount of water into the mixing apparatus using a flow control device under mixing, wherein the flow rate is sufficiently low to avoid agglomeration, and allowing the humidity control substance to adsorb the water to form the hydrated humidity control substance,
(v) optionally repeating step (iv) until the amount of water determined in step (ii) has been completely introduced into the mixing apparatus.

In the context of the present application, the term "moisture content" (also abbreviated as "MC") relates to the amount of water (expressed as weight) adsorbed in a humidity control substance relative to the wet weight of said humidity control substance. Herein, the moisture content is usually expressed in percent by weight.

The term "relative humidity" (also abbreviated as "RH") at a specific temperature is defined as the ratio of the existing content of water vapour to the saturation content of water vapour. Relative humidity is defined according to the following equation:

$$RH = c(H_2O)/c^{sat}(H_2O)$$

where $c(H_2O)$ is the observed content of water vapour, and $c^{sat}(H_2O)$ is the content of water vapour at saturation.

Relative humidity is usually expressed as a percentage.

The term "equilibrium moisture content" (also abbreviated as "EMC") at a specific temperature is defined as the moisture content of a substance at which it is in equilibrium with the specific relative humidity of the surrounding atmosphere.

Figure 1:
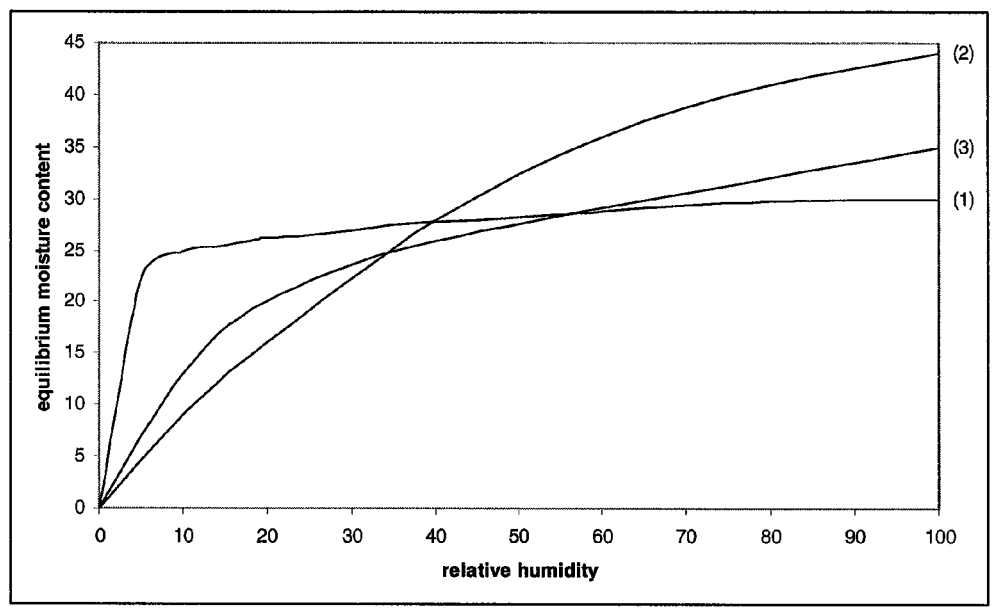
FIG. 1 compares the equilibrium moisture content at various relative humidities of three substances: 1) a molecular sieve, 2) a silica gel and 3) a clay.

The present invention is based on the observation that a specific EMC of a specific desiccant material correlates with a specific RH of the surrounding atmosphere. Hence, within a specific range of RH, a relation exists between EMC and RH. In FIG. 1, such a relation is shown in an schematic manner for exemplary substances (1)-(3). Said substance (1) is an exemplary molecular sieve. Said substances (2) and (3) are examples of a silica gel and a clay, respectively.

Generally, a specific desiccant material may be suitable for establishing and/or maintaining a specific relative humidity over a specific range only. Thus, in the case of exemplary substance (1) a large change in EMC is observed when RH of the surrounding atmosphere changes within the range from 0% to about 5% RH. In contrast, in the RH range from about 5% to 100% (saturation), no substantial change in EMC can be observed even when RH of the surrounding atmosphere changes significantly. As a result, said exemplary substance (1) is suitable for controlling RH of the surrounding atmosphere in a range of from 0% to about 5%. In contrast, in the range of from about 5% to 100% said exemplary molecular sieve is not capable of adsorbing additional moisture from the surrounding atmosphere, i.e. of acting as a desiccant, because the maximum EMC of said exemplary molecular sieve (saturation) has already been reached.

In the case of the exemplary substance (2) and the exemplary substance (3), both said materials show significant changes of the EMC over a broad range of RH of the surrounding atmosphere, namely from about 0% to about 100% RH. Thus, said substances (2) and (3) are capable of adsorbing and releasing moisture from the surrounding atmosphere, i.e. of acting as a desiccant and a humectant, over said broad range of RH of the surrounding atmosphere and hence are suitable for establishing and/or maintaining a specific relative humidity selected from the range between 0% and 100%.

In the following, the individual steps of the process according to the present invention will be explained in more detail.

Step (i): Providing Humidity Control Substance

In general, any desiccant material commonly known in the art is suitable as a starting humidity control substance. As indicated hereinabove, a specific desiccant material can be suitable as humidity control substance for establishing and/or maintaining a specific relative humidity within a specific range. Non-limiting examples of desiccant materials include silica gel, clay such as bentonite clay and montmorillonite clay, molecular sieve and mixtures thereof. Generally, silica gels and clays show a correlation between EMC and RH of the surrounding atmosphere similar to exemplary compounds (2) and (3) as shown in FIG. 1. For the reasons explained hereinabove, such materials are suitable for establishing and/or maintaining a specific RH over a broad range. Therefore, silica gels and clays are preferred starting humidity control substances in the process of the present invention.

The starting humidity control substance usually is in particulate form such as a powder, granules or beads, wherein the size of the particles can be in the range of from 0.1-5 mm, but is not limited to said values. The particle size is essentially chosen depending on the intended use. As an example, a particle size of 0.2-1.4 mm can be mentioned as being suitable for most applications.

In a preferred embodiment, the starting humidity control substance comprises silica gel.

It is evident that the moisture content of the starting humidity control substance to be used in the process according to the present invention has to be lower than the desired moisture content.

The amount of the starting humidity control substance relates to the weight of said substance.

Step (ii): Determining the Amount of Water to be Added

The amount of water to be added to the starting humidity control substance has to be determined in order to impart the desired moisture content to the humidity control substance. The desired moisture content depends on the relative humidity of the atmosphere to be established and/or maintained within a sealable packaging material.

The amount of water necessary for imparting said desired moisture content depends on several factors, including the type of humidity control substance, the relative humidity to be established and/or maintained in the environment in which the hydrated humidity control substance will be used and the temperature at which the humidity control substance will be used. Taking these factors into consideration, the quantity of water that needs to be added to the humidity control substance can be determined.

It is essential to know the relation between the EMC of the humidity control substance and the RH established in the atmosphere surrounding said humidity control substance. Hence, for any specific humidity control substance, a relation between a specific EMC and a specific RH that is established and maintained similar to the relation shown in FIG. 1 has to be determined. Said relation could be viewed as representing a "calibration curve" valid with respect to a specific humidity control agent and a specific temperature at which the hydrated humidity control agent is to be used.

The procedure for establishing such a calibration curve comprises the following steps:

a) Establishing Parameters for the Preparation of a Homogeneous Sample of Hydrated Humidity Control Substance.

It was found that the relation between EMC and RH is influenced by
the rate of water addition to the humidity control substance used as the starting material and
the period during which mixing is effected.

Therefore, it is important to set the above-mentioned parameters to specific values which then have to be employed in the preparation of samples used for obtaining a calibration curve as well as in the preparation of the desired hydrated humidity control substance. Hence, with respect to the above-mentioned parameters, the process for preparing samples for calibration has to be identical to the process for preparing the desired hydrated humidity control substance.

Furthermore, it was found that the charging level of the mixing chamber of the mixing apparatus, defined as the ratio $$CL=[V(\text{starting material})]/[V(\text{mixing chamber})]$$

wherein

V(starting material) represents the volume occupied by the humidity control substance used as a starting material in the mixing chamber of the mixing apparatus, V(mixing chamber) represents the total volume of the mixing chamber of the mixing apparatus, has to be similar in the preparation of samples used for obtaining a calibration curve as well as in the preparation of the desired hydrated humidity control substance. In this context, the term "similar" means that the ratio CL has to be selected from a range of from 0.08-0.50. Thus, the ratio CL employed in the preparation of samples for obtaining a calibration curve can be independently selected from said range. Likewise, the ratio CL employed in the preparation of the desired hydrated humidity control substance can be independently selected from said range. For instance, for the preparation of samples from which a calibration curve is obtained, a low ratio CL such as 0.08 can be selected, which implies that a relatively small batch is prepared. For the preparation of the desired hydrated humidity control substance, a ratio CL such as 0.50 can be selected, which implies that a relatively large batch is prepared.

b) Preparation of a Sample of a Hydrated Humidity Control Substance Having a Specific Moisture Content.

A sample of the hydrated humidity control substance is prepared by hydrating the specific desiccant material by adding a predetermined amount of water to a predetermined amount of essentially dry desiccant material under mixing such that a sample homogeneous with respect to its moisture content is obtained.

c) Determination of the RH Established by Said Sample.

As described hereinbelow under "Determination of parameters", the RH established by said sample is measured by placing a predetermined amount of the hydrated humidity control substance in a container that is equipped with the probe of a hygrometer and sealed. The RH of the atmosphere in the sealed container is measured at a predetermined temperature until RH remains constant, i.e. until equilibrium is reached. After equilibrium has been reached, the RH established within the sealed container is recorded.

d) Determination of the Equilibrium Moisture Content of the Hydrated Humidity Control Substance.

The moisture content of the humidity control substance is measured as described hereinbelow under "Determination of parameters". Said moisture content is the equilibrium moisture content correlating to the RH recorded at equilibrium.

Repeating above-described steps b)-d), wherein in step b) a hydrated humidity control substance having a different moisture content is prepared, for instance by varying the amount of water added to said predetermined amount of essentially dry desiccant material, equilibrium data are collected for a number of samples sufficiently covering the range of RH for which the relation between EMC and RH is to be established.

For example, it was found that if the hydrated humidity control substance prepared according to the present invention is silica gel, the relation between the relative humidity established and/or maintained and the equilibrium moisture content at a temperature of 20° C. is typically characterized by the following data pairs:

| RH [%] | 7-13 | 17-23 | 27-33 |
|---|---|---|---|
| EMC [%] | 6.3-8.3 | 10.3-12.3 | 14.8-16.8 |

Thus, for instance, a relative humidity in the range of 7-13% can be established and/or maintained by using silica gel hydrated to an EMC in the range of from 6.3-8.3%.

The number of data to be collected is determined by considerations regarding statistical accuracy and reliability. For instance, regression analysis can be used in order to evaluate the data collected.

Figure 2:
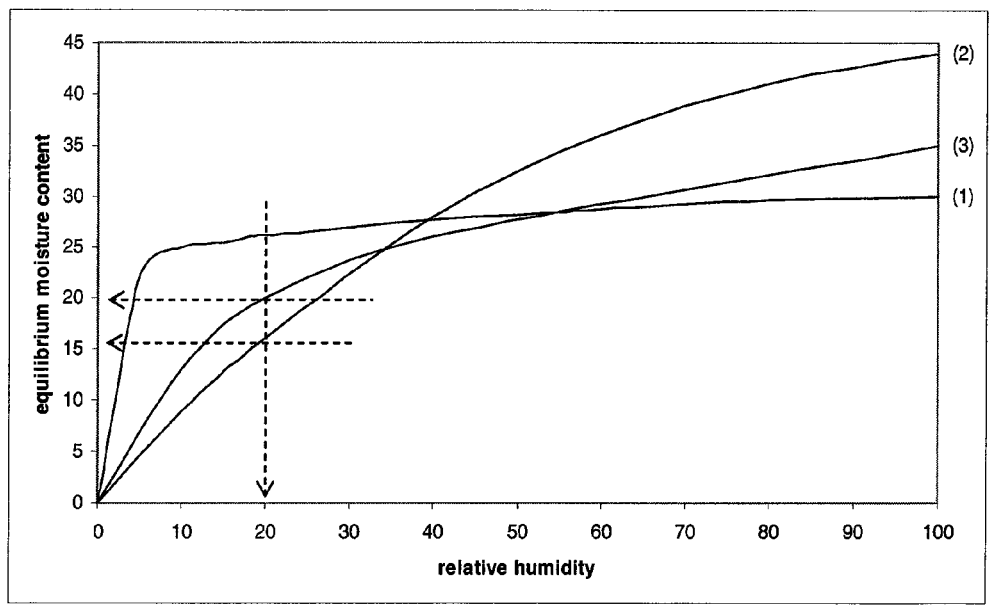
FIG. 2 shows the same information as FIG. 1, but highlights the performance of the three materials at a relative humidity of 20% and an equilibrium moisture content of 15% and 20%.

On basis of the data obtained as described above, the target moisture content of a specific humidity control agent necessary in order to impart to the humidity control agent the capability of establishing and/or maintaining a specific desired relative humidity of the surrounding atmosphere can be determined. For instance, it is indicated in FIG. 2 that in order to establish and/or maintain a relative humidity of 20% the EMC of humidity control substance (2) would have to be adjusted to about 16%. Likewise, the EMC of humidity control substance (3) would have to be adjusted to about 20%.

In order to impart the thus determined target moisture content MCt to a predetermined amount of humidity control substance $m_i$ having an initial moisture content MCi, the amount of water $m_{water}$ to be added can be calculated by means of the following formula.

$$m_{water} = m_i \cdot (MCt - MCi)/(MCt - 100) \quad \text{(eq. (I))}$$

wherein $m_{water}$ represents the weight of water to be added [kg],
MCt represents the desired target moisture content [%],
MCi represents the moisture content of the humidity control substance used as a starting material [%], and
$m_i$ represents the weight of said humidity control substance used as a starting material [kg].

Step (iii): Introducing Humidity Control Substance into a Mixing Apparatus

Typically, the entire amount of humidity control substance to be treated is introduced into the mixer in a single batch.

Generally any mixing apparatus that is commonly used for mixing solid components with liquid components in amounts such that a solid mixture is formed is suitable for step (iii) of the process of the present invention.

A suitable mixing apparatus is one that can mix the humidity control substance with liquid water efficiently and quickly. In order to impart the desired moisture content to the humidity control substance with high accuracy, the free exchange between the headspace in the mixing chamber of the mixing apparatus and the atmosphere surrounding the mixing apparatus can be decreased. Thus, the transport of water into or from the mixing chamber by means of humid air can be prevented. The higher the accuracy desired with respect to the MC imparted to the humidity control substance, the lower the exchange with the surrounding atmosphere should be. In one embodiment, the amount of water transported to or from the mixing chamber by exchange with the surrounding atmosphere relative to the amount of liquid water introduced in order to hydrate said humidity control substance should be less than 3%, preferably less than 1%.

A cover or lid which covers the mixing chamber in order to prevent the undesirable escape of dust during mixing is usually suitable for this purpose. It is not necessary that the apparatus can be sealed in a gas-tight manner.

The mixing apparatus can be equipped with a device that is suitable for preventing water from escaping. Such a device can for instance be a condenser in which any water escaping from the mixing apparatus in gaseous form is condensed, i.e. converted to a liquid, and re-introduced into said mixing apparatus. The apparatus can be provided with an aspirator in order to prevent dust from escaping.

As an example, the mixing machine contains paddles that blend the humidity control substance with the water. An exemplary mixing machine suitable for carrying out step (iii) of the process described herein is a paddle mixer manufactured by Reimelt Henschel Mischsysteme GmbH.

Step (iv): Introducing Water into Said Mixing Apparatus and Allowing the Humidity Control Substance to Adsorb the Water After the starting humidity control substance has been introduced into the mixing apparatus, mixing is started and at least a portion of the amount of water determined in step (ii) is introduced into the mixing apparatus.

The water is introduced into the mixing apparatus at a rate that is adjusted in order to avoid the formation of a slurry or solution that might cause agglomeration. Suitably, a device which controls the rate and quantity of water that is added is used for this purpose. Furthermore, the rate of addition can be controlled in order to avoid excessive heating of the humidity control substance.

In a particularly preferred embodiment, the water is sprayed onto the humidity control substance by use of one or more conventional spray nozzles.

When the water is introduced into the mixing apparatus, it can have a temperature of from 5-60° C. Typically, the water is introduced at a temperature of from 10-20° C.

Once all of the water has been introduced into the mixing apparatus containing the humidity control substance, mixing is continued until the water has been adsorbed by the humidity control substance.

The time required for mixing the humidity control substance and water can be relatively short such as 15 minutes or less. Typically, the time required for mixing is 5 minutes or less. The minimum time required in order to achieve the desired homogeneity of moisture content can be determined by carrying out a limited number of experiments in which the achieved homogeneity of moisture content is determined after a predetermined time of mixing according to the procedure described herein.

In processes imparting a specific moisture content of the humidity control substance by allowing the substance to adsorb water vapour from an atmosphere controlled with respect to its relative humidity, the time required until a specific moisture content of the humidity control substance is reached is significantly longer, namely from 1 to 7 days.

Thus, the process according to the present invention is significantly more time-efficient than the processes known from the prior art.

The absorption of water in a starting humidity control substance, i.e. a desiccant as described hereinabove, is an exothermic process and hence causes the generation of heat and a temperature rise of the humidity control substance, if said heat can not be dissipated in a manner sufficiently rapid. Therefore, the mixing apparatus can be cooled.

In a preferred embodiment the mixing apparatus is maintained at a temperature that does not rise higher than 40-50° C. above the temperature at which the addition of water is started. Preferably, the temperature during the mixing procedure does not rise higher than 30-45° C. above the temperature at which the addition of water is started.

Independently, the generation of heat can be controlled by adjusting the rate of addition of the water added for hydrating the humidity control substance, by adjusting temperature and flow of the added water and/or by adjusting the speed at which the mixing device operates.

Step (v): Repeating Step (iv)

The predetermined amount of water can be introduced into the mixing apparatus in a single portion or in several portions. When it is chosen to introduce said water in several portions, step (iv) is repeated until the entire amount of water has been introduced.

In any case, step (iv) is carried out as the final step of the process. Subsequently, the hydrated humidity control substance is removed from the mixing apparatus.

The hydrated humidity control substance can be stored in a gas-tight container until being used for establishing and/or maintaining a specific constant level of relative humidity in a storage container.

The hydrated humidity control substance can be packaged in ready-for-use units of appropriate size such as in bags, pouches, tubes, containers, bottles etc. which allow the permeation of water vapour. This packaging step can be carried out immediately before use of the hydrated humidity control substance or the packaged ready-for-use units can be stored in a gas-tight container until being used for establishing and/or maintaining a specific constant level of relative humidity in a storage container.

The process according to the present invention is suitable for preparing large batches of hydrated humidity control substance using standard equipment. Typically, the batch size is larger than 20 kg, for instance 80 kg.

Product Obtainable by Said Process

Surprisingly, it was found that the hydrated humidity control substance obtainable by the above-described process has a moisture content that is more uniform than in a product obtained from a conventional process, i.e. by allowing the substance to adsorb water vapour from an atmosphere controlled with respect to its relative humidity such as in a climate chamber. This means that the standard deviation of the mean moisture content as determined from various samples of a single batch is significantly smaller.

This is particularly advantageous as the standard deviation of the mean level of relative humidity established and/or maintained within a sealed storage container using the hydrated humidity control substance according to the present invention is likewise lower than the standard deviation of the mean level of relative humidity established and/or maintained within a sealed storage container using a conventional hydrated humidity control substance.

Typically, the standard deviation of the mean moisture content determined from various samples of a single batch is 5% or lower relative to the mean moisture content. In a preferred embodiment, said standard deviation is 3% or lower, more preferably 2% or lower, even more preferably 1.5% or lower, most preferably 1% or lower.

In order to achieve a lower standard deviation, homogeneity of the hydrated humidity control substance can be increased by increasing the period during which mixing of the substance is continued after the predetermined amount of water has been added. As an alternative or additional measure, the rate of addition of said predetermined amount of water can be lowered. A high homogeneity can also be accomplished by appropriately selecting the mixing device such that efficient mixing of the humidity control substance is achieved. In this respect, it has been found to be advantageous to use a mixer equipped with two groups of paddles that rotate around a vertical axis located in the center of the mixing chamber, wherein the groups of paddles are arranged in two levels such that one group of paddles rotates around said vertical axis in a horizontal plane above the other group of paddles.

It was also found that the process of the present invention is suitable for imparting advantageous microbiological properties to the hydrated humidity control substance in terms of the contamination with germs. The amount of germs in a hydrated humidity control substance according to the present invention is significantly lower in comparison to a hydrated humidity control substance prepared in a conventional manner, i.e. by allowing the substance to adsorb water vapour from an atmosphere controlled with respect to its relative humidity such as in a climate chamber when water having a low content of germs is used.

Thus, for instance, when drinking water that was treated by ultrafiltration in order to remove germs is used in the process according to the present invention, the hydrated humidity control substance obtained is essentially free of germs as shown in the table hereinbelow. In contrast, in a hydrated humidity control substance conventionally prepared in a climate chamber, various germs are present in significant amounts. The reason is that processing of the humidity control substance according to the present invention can be carried out fast and without significant exposure to air through which germs are typically transported. In contrast, in a conventional process using a climate chamber, extended exposure to air is required such that contamination with germs can not be avoided even if essentially sterile water was supplied to the climate chamber.

Therefore, the hydrated humidity control substance according to the present invention is particularly suitable for being used in containers in which an atmosphere controlled with respect to humidity has to be established and/or maintained and in which at the same time microbiological contamination has to be avoided. Hence, the hydrated humidity control substance according to the present invention is particularly suitable for being used in containers for packaging pharmaceutical and diagnostic products.

Typical amounts of germs in hydrated humidity control substance expressed as number of colony forming units per gram (CFU/g):

|  | according to the invention [CFU/g] | conventional [CFU/g] |
|---|---|---|
| Aerobic bacteria (1) | <1 | 100 |
| Yeasts (2) | <1 | <100 |
| Moulds (2) | <1 | 100 |
| Staphylococcus aureus (3) | <1 | <100 |
| Enterobacteria (4) | <1 | <10 |

Method used for determination (standards by French Association of Standardization AFNOR):
(1) NF V08-051
(2) NF V08-059
(3) NF V08-057
(4) NF V08-054

EXAMPLES

In the following, the present invention is illustrated by means of examples.

Determination of Parameters

In the following, the methods for determining the parameters mentioned in the present application will be described.

Moisture Content

The moisture content of said starting humidity control substance is determined by a thermogravimetric method using a Mettler Toledo Halogen Moisture Analyzer model HR73 (available from Mettler Toledo AG, 8606 Greifensee, Switzerland).

A sample of the material to be analyzed is fed into said apparatus and the initial sample weight ("wet weight") is determined by means of the integrated balance. Subsequently, the sample is heated by means of irradiation with a halogen lamp to a temperature of 160° C. while the sample weight is continuously recorded. When the weight change rate is lower than 1 mg/45 seconds, heating is stopped and the final weight ("dry weight") is determined. The difference between the initial weight and the final weight is assumed to be the amount of adsorbed water. On basis of the value thus obtained, the moisture content can be calculated as defined hereinabove using the following formula.

$$MC=(WW-DW)/WW$$

wherein
MC represents the moisture content,
WW represents the "wet weight" of the sample, and
DW represents the "dry weight" of the sample.

Thus, the difference between WW and DW is assumed as being the amount of water adsorbed in the humidity control substance.

Relative Humidity

The relative humidity of the atmosphere surrounding the humidity control substance as described herein is determined by using a hygrometer of type testo 645 (available from Testo AG, 79853 Lenzkirch, Germany), equipped with a standard ambient air probe.

In order to determine the relative humidity established by a specific humidity control substance, a sample of the substance (8 g) is introduced into an 330 ml Erlenmeyer flask. The flask is sealed with a rubber stopper having a bore through which the probe of the hygrometer is introduced into the flask. The flask is allowed to stand at a controlled temperature until the reading of the hygrometer is constant (after about 30-100 minutes).

Homogeneity

In order to evaluate homogeneity of hydration of a batch of hydrated humidity control substance, samples are taken from the batch and analyzed with respect to moisture content. In the procedure employed in the present application, 30 samples are collected from a batch having a weight of about 80 to 120 kg. The moisture content of each sample is determined as described hereinabove.

From the moisture content data obtained from said samples, the mean value $\mu$, the standard deviation $\sigma$ and the relative standard deviation $\sigma rel = \sigma/\mu$ are calculated. On basis of upper and lower specification limits (USL, LSL) which are defined as the target moisture content$\pm 1\%$ the process capability index CpK is calculated.

Homogeneity of the hydrated humidity control substance is held acceptable when CpK>1.33.

Silica gel 11132 (available from Chemsource) was used as the starting material for the hydrated humidity control agent described in the following examples.

Reference Example

In exploratory experiments, it was found that at a temperature of 20° C. an EMC as shown in table 1 is required in order to establish a RH of 10%, 20% and 30%, respectively.

TABLE 1

| EMC [%] | RH [%] |
|---|---|
| 7.3 | 10 |
| 11.3 | 20 |
| 15.8 | 30 |

Example 1

Preparation of hydrated silica gel for establishing and/or maintaining a relative humidity of 10%.

According to table 1, the target moisture content is 7.3%.

Three runs of the process described in the following were carried out. The initial moisture content of the starting material is shown in table 2. The ratio CL is 0.40.

The amount of water to be added is determined according to equation (I) on basis of the target moisture content and the initial moisture content shown in tables 1 and 2, respectively. The calculated amount of water to be added is shown in table 2.

TABLE 2

|  | Run 1 | Run 2 | Run 3 |
|---|---|---|---|
| initial MC [%] | 0.38 | 0.46 | 0.39 |
| Amount of water [l] | 5.97 | 5.90 | 5.96 |

By means of a scale hopper, 80 kg of silica gel having a moisture content as indicated in table 2 is placed in a mixer equipped with spraying nozzles. Mixing is started and the amount of demineralised water indicated in table 2 is sprayed onto the silica gel at a rate of about 6 liters per minute. After the addition of water was complete and mixing was continued for additional 0.5 minutes. Then, mixing was stopped and the hydrated silica gel was packed in a plastic drum under vacuum.

In order to evaluate homogeneity, 30 samples were collected from the entire volume of the batch. The moisture content was determined for each sample. The results are shown in table 3.

TABLE 3

| Sample | MC [%] | | |
|---|---|---|---|
| no. | Run 1 | Run 2 | Run 3 |
| 1 | 7.57 | 7.37 | 7.28 |
| 2 | 7.54 | 7.52 | 7.32 |
| 3 | 7.54 | 7.23 | 7.28 |
| 4 | 7.44 | 7.30 | 7.21 |
| 5 | 7.58 | 7.33 | 7.37 |
| 6 | 7.53 | 7.31 | 7.28 |
| 7 | 7.48 | 7.31 | 7.26 |
| 8 | 7.56 | 7.45 | 7.32 |
| 9 | 7.64 | 7.31 | 7.34 |
| 10 | 7.62 | 7.57 | 7.52 |
| 11 | 7.50 | 7.38 | 7.26 |
| 12 | 7.65 | 7.38 | 7.27 |
| 13 | 7.55 | 7.44 | 7.34 |
| 14 | 7.46 | 7.30 | 7.27 |
| 15 | 7.55 | 7.33 | 7.33 |
| 16 | 7.55 | 7.43 | 7.27 |
| 17 | 7.48 | 7.26 | 7.34 |
| 18 | 7.51 | 7.34 | 7.25 |
| 19 | 7.52 | 7.42 | 7.34 |
| 20 | 7.67 | 7.55 | 7.57 |
| 21 | 7.66 | 7.37 | 7.39 |
| 22 | 7.51 | 7.38 | 7.36 |
| 23 | 7.63 | 7.40 | 7.28 |
| 24 | 7.51 | 7.28 | 7.29 |
| 25 | 7.56 | 7.49 | 7.31 |
| 26 | 7.55 | 7.26 | 7.24 |
| 27 | 7.54 | 7.31 | 7.26 |
| 28 | 7.57 | 7.34 | 7.35 |
| 29 | 7.52 | 7.40 | 7.40 |
| 30 | 7.65 | 7.55 | 7.47 |
| $\mu$ | 7.55 | 7.38 | 7.33 |
| $\sigma$ | 0.0607 | 0.0911 | 0.0812 |
| $\sigma rel$ [%] | 0.80 | 1.24 | 1.11 |
| CpK | 2.44 | 2.28 | 2.77 |

The relative humidity established in a sealed container was determined for various samples. The results are shown in table 4.

TABLE 4

| | Run 1 | | Run 2 | | Run 3 | |
|---|---|---|---|---|---|---|
| Sample no. | RH [%] | T [° C.] | RH [%] | T [° C.] | RH [%] | T [° C.] |
| 1 | 9.9 | 21.1 | 9.6 | 20.4 | 9.3 | 20.6 |
| 2 | 10.0 | 21.4 | 9.7 | 20.3 | 9.5 | 20.3 |
| 3 | 10.1 | 21.0 | 9.3 | 20.2 | 9.5 | 20.4 |

TABLE 4-continued

| Sample no. | Run 1 RH [%] | Run 1 T [° C.] | Run 2 RH [%] | Run 2 T [° C.] | Run 3 RH [%] | Run 3 T [° C.] |
|---|---|---|---|---|---|---|
| 4 | 9.8 | 21.2 | 9.5 | 20.0 | 8.8 | 20.4 |
| 5 | 9.9 | 21.0 | 9.5 | 20.4 | 9.6 | 20.2 |
| 6 | 9.7 | 20.9 | 9.3 | 20.9 | 9.4 | 20.4 |
| 7 | 9.9 | 20.7 | 9.2 | 21.3 | 9.2 | 20.2 |
| 8 | 9.8 | 20.7 | 9.4 | 21.1 | 9.6 | 20.1 |
| 9 | 10.0 | 20.7 | 9.4 | 21.3 | 9.6 | 20.3 |
| 10 | 10.2 | 20.0 | 9.8 | 20.3 | 9.7 | 20.4 |
| μ | 9.9 | | 9.5 | | 9.4 | |
| σ | 0.1494 | | 0.1889 | | 0.2658 | |
| σrel [%] | 1.50 | | 1.99 | | 2.82 | |

Example 2

Preparation of hydrated silica gel for establishing and/or maintaining a relative humidity of 20%.

According to table 1, the target moisture content is 11.3%.

Three runs of the procedure described hereinabove with respect to Example 1 were carried out with the modifications described in the following.

The initial moisture content of the starting material is shown in table 5.

TABLE 5

| | Run 1 | Run 2 | Run 3 |
|---|---|---|---|
| initial MC [%] | 0.28 | 0.50 | 0.49 |
| amount of water [l] | 9.93 | 9.74 | 9.75 |

The amount of silica gel was 80 kg to which the amount of demineralised water as indicated in table 5 was added at a rate of 6 liters per minute. Subsequently, stirring was continued for 0.5 minutes.

The moisture content of the samples that were collected as described with respect to Example 1 is shown in table 6.

TABLE 6

| Sample no. | MC [%] Run 1 | MC [%] Run 2 | MC [%] Run 3 |
|---|---|---|---|
| 1 | 11.39 | 11.38 | 11.25 |
| 2 | 11.57 | 11.48 | 11.20 |
| 3 | 11.51 | 11.58 | 11.35 |
| 4 | 11.46 | 11.37 | 11.49 |
| 5 | 11.44 | 11.51 | 11.48 |
| 6 | 11.49 | 11.29 | 11.30 |
| 7 | 11.42 | 11.42 | 11.25 |
| 8 | 11.49 | 11.30 | 11.26 |
| 9 | 11.51 | 11.18 | 11.25 |
| 10 | 11.80 | 11.60 | 11.52 |
| 11 | 11.51 | 11.23 | 11.14 |
| 12 | 11.54 | 11.47 | 11.29 |
| 13 | 11.69 | 11.30 | 11.21 |
| 14 | 11.44 | 11.51 | 11.37 |
| 15 | 11.51 | 11.50 | 11.31 |
| 16 | 11.37 | 11.14 | 11.37 |
| 17 | 11.44 | 11.44 | 11.25 |
| 18 | 11.43 | 11.20 | 11.60 |
| 19 | 11.55 | 11.42 | 11.33 |
| 20 | 11.65 | 11.64 | 11.59 |
| 21 | 11.53 | | 11.33 |
| 22 | 11.52 | 11.82 | 11.53 |
| 23 | 11.62 | | 11.24 |
| 24 | 11.57 | 11.14 | 11.37 |
| 25 | | 11.50 | 11.32 |
| 26 | 11.42 | 11.27 | 11.37 |
| 27 | 11.43 | 11.28 | 11.32 |
| 28 | 11.50 | 11.29 | 11.27 |
| 29 | 11.42 | 11.18 | 11.32 |
| 30 | 11.79 | 11.87 | 11.49 |
| μ | 11.52 | 11.40 | 11.35 |
| σ | 0.1076 | 0.1888 | 0.1178 |
| σrel [%] | 0.93 | 1.66 | 1.04 |
| CpK | 2.42 | 1.58 | 2.70 |

The relative humidity established in a sealed container was determined for various samples. The results are shown in table 7.

TABLE 7

| Sample no. | Run 1 RH [%] | Run 1 T [° C.] | Run 2 RH [%] | Run 2 T [° C.] | Run 3 RH [%] | Run 3 T [° C.] |
|---|---|---|---|---|---|---|
| 1 | 19.2 | 20.6 | 18.8 | 20.4 | 19.1 | 20.9 |
| 2 | 19.3 | 20.0 | 18.9 | 20.4 | 19.2 | 19.9 |
| 3 | 19.4 | 20.2 | 18.9 | 20.0 | 18.8 | 20.0 |
| 4 | 19.0 | 20.3 | 19.2 | 20.0 | 19.2 | 20.8 |
| 5 | 19.0 | 20.0 | 19.0 | 20.1 | 19.0 | 20.8 |
| 6 | 19.0 | 20.6 | 18.9 | 20.0 | 18.9 | 20.6 |
| 7 | 19.1 | 20.3 | 18.7 | 20.4 | 19.0 | 20.4 |
| 8 | 19.2 | 20.3 | 18.8 | 20.2 | 19.4 | 20.8 |
| 9 | 19.1 | 20.3 | 19.1 | 20.2 | 18.8 | 20.2 |
| 10 | 19.5 | 20.6 | 19.4 | 20.3 | 19.1 | 20.6 |
| μ | 19.2 | | 19.0 | | 19.1 | |
| σ | 0.1751 | | 0.2111 | | 0.1900 | |
| σrel [%] | 0.91 | | 1.11 | | 1.00 | |

Example 3

Preparation of hydrated silica gel for establishing and/or maintaining a relative humidity of 30%.

According to table 1, the target moisture content is 15.8%.

The initial moisture content of the starting material was 0.59%.

The procedure described hereinabove with respect to Example 1 was carried out with the modifications described in the following.

The amount of silica gel was 80 kg to which 14.45 liters of demineralised water was added at a flow rate of 6 liters per minute. Subsequently, stirring was continued for 0.5 minutes.

The moisture content of the samples that were collected as described with respect to Example 1 and the relative humidity established is shown in table 8.

TABLE 8

| Sample no. | MC [%] | RH [%] | T [° C.] |
|---|---|---|---|
| 1 | 15.61 | 29.1 | 21.7 |
| 2 | 15.75 | 28.2 | 22.0 |
| 3 | 15.27 | 30.2 | 21.6 |
| 4 | 15.83 | 29.3 | 21.6 |
| 5 | 15.85 | 29.6 | 21.7 |
| 6 | 15.68 | 30.5 | 21.7 |
| μ | 15.67 | 29.48 | |
| σ | 0.2135 | 0.8232 | |
| σrel [%] | 1.36 | 2.79 | |
| CpK | 1.35 | | |

Comparative Examples 1-3

Preparation of hydrated silica gel using a conventional process of storing silica gel in an atmosphere controlled with respect to relative humidity.

5000 pouches each containing 8 g of silica gel were stored in a climate chamber of type Vötsch VC4020 under an atmosphere having a relative humidity of 10% (comparative example 1), 20% (comparative example 2) and 30% (comparative example 3), respectively, for a period indicated in table 9 in order to prepare silica gel capable of establishing and maintaining a relative humidity of 10% (24 h), 20% (120 h) and 30% (168 h), respectively.

The results obtained regarding homogeneity with respect to moisture content and relative humidity (measured at a temperature of 21° C.) are shown in table 9.

TABLE 9

| Sample no. | Comparative example 1 (24 h) | | Comparative example 2 (120 h) | | Comparative example 3 (168 h) | |
|---|---|---|---|---|---|---|
| | MC [%] | RH [%] | MC [%] | RH [%] | MC [%] | RH [%] |
| 1 | 5.95 | 11.0 | 11.48 | 20.2 | 15.09 | 30.3 |
| 2 | 5.93 | 10.6 | 11.53 | | 15.35 | 32.0 |
| 3 | 5.89 | 10.9 | 11.55 | | 14.80 | |
| 4 | | | 11.44 | 19.6 | 14.55 | |
| 5 | 5.43 | 8.5 | 11.44 | | 14.69 | |
| 6 | 5.25 | 7.5 | 11.57 | | 14.73 | |
| 7 | 6.39 | 8.3 | 10.50 | 18.4 | 16.06 | 26.0 |
| 8 | 6.10 | 10.8 | 10.54 | | | |
| 9 | | | 10.55 | | | |
| 10 | 6.65 | 12.2 | 11.17 | 19.3 | | |
| 11 | 7.41 | 11.4 | 11.22 | | | |
| 12 | 7.07 | 12.3 | 11.20 | | | |
| 13 | 7.15 | 10.4 | 10.70 | 18.2 | | |
| 14 | 6.72 | 10.9 | 10.76 | | | |
| 15 | | | 10.84 | | | |
| 16 | | | 10.43 | 18.0 | | |
| 17 | 6.40 | 9.4 | 10.49 | | | |
| 18 | 6.39 | 10.0 | 10.53 | | | |
| μ | 6.34 | 10.30 | 11.00 | 18.95 | 15.04 | 29.43 |
| σ | 0.6312 | 1.4240 | 0.4397 | 0.8803 | 0.5252 | 3.0925 |
| σrel [%] | 9.96 | 13.82 | 4.00 | 4.65 | 3.49 | 10.51 |

It becomes evident that the process according to the present invention can be carried out significantly faster than the processes known from the prior art. The process is suitable for producing large batches of hydrated humidity control substance. Furthermore, the hydrated humidity control substance obtainable by said process has improved homogeneity with respect to moisture content and is therefore capable of establishing and/or maintaining a specific relative humidity with higher accuracy.

It can be seen from the examples described hereinabove that the EMC required in order to establish a specific RH using a humidity control agent that was hydrated according to the process of the present invention differs from the EMC required in order to establish said specific RH using a humidity control agent that was hydrated in a conventional manner.

The invention claimed is:

1. Process for preparing a humidity control substance having a target moisture content (MCt), comprising:
   (i) providing a predetermined amount by weight of a humidity control substance ($m_i$) having a moisture content (MCi) lower than a target moisture content (MCt) with respect to a relative humidity of the atmosphere to be maintained within a sealable packaging material,
   (ii) measuring the moisture content MCi,
   (iii) determining an amount of liquid water ($m_{water}$) to be added to the humidity control substance $m_i$, wherein the amount of water $m_{water}$ to be added is determined using the formula $$m_{water} = m_i \times (MCi - MCt)/(MCt - 100),$$

wherein
   $m_{water}$ is the weight of water to be added in kg,
   MCt is the target moisture content of the humidity control substance in %,
   MCi is the moisture content of the humidity control substance used as a starting material in %, and
   $m_i$ is the weight of the humidity control substance used as a starting material in kg,
   (iv) introducing said predetermined amount of the humidity control substance $m_i$ into a mixing apparatus having a closed mixing chamber at a charging level ratio (CL) of from 0.08 to 0.50, wherein CL is the ratio of the volume of the humidity control substance used as a starting material to the volume of the mixing chamber of the mixing apparatus, and
   (v) adding the determined amount of liquid water ($m_{water}$) into the mixing chamber mixing apparatus under mixing over a period of up to 15 minutes, wherein the mixing chamber is maintained at a temperature not higher than 40-50° C. above the temperature at which the addition of liquid water is started, and wherein a flow rate of the water is sufficiently low to avoid agglomeration, to allow the humidity control substance to adsorb the water to form the humidity control substance, wherein the humidity control substance is homogeneously hydrated to the target moisture content (MCt).

2. Process according to claim 1, wherein said humidity control substance is selected from the group consisting of silica gel, bentonite clay, montmorillonite clay and a mixture thereof.

3. The process of claim 2, wherein said humidity control substance comprises silica gel.

4. Process according to claim 1, wherein the humidity control substance has a particle size of 0.1-5 mm.

5. Process according to claim 1, wherein the mixing apparatus is cooled.

6. Process according to claim 1, wherein the target moisture content MCt of the humidity control substance is the equilibrium moisture content EMC of said humidity control substance in a sealed container.

7. Process according to claim 6, wherein the MCt is determined by a calibration curve correlating an equilibrium moisture content EMC of the humidity control substance with the relative humidity RH of the surrounding atmosphere in a sealed container.

8. Process according to claim 7, wherein the calibration curve is determined by a method comprising:
   (a) preparing a sample of the humidity control substance having a specific moisture content by adding a predetermined amount of water to a predetermined amount of the humidity control substance under mixing such that a sample homogeneous with respect to its moisture content is obtained,
   (b) placing a predetermined amount of the obtained sample of the humidity control substance in a container,
   (c) measuring the relative humidity of the atmosphere in the sealed container at a predetermined temperature until RH remains constant and recording the relative humidity thus established within the sealed container,
   (d) determining the weight of a sample of the humidity control substance obtained as described under (a), (e) drying the sample and determining the weight of the dry sample, and (f) calculating the moisture content of the sample according to the following formula $$MC = (WW - DW)/WW$$

wherein

MC represents the moisture content,

WW represents the weight of the sample of the humidity control substance obtained as described hereinabove under (a), and DW represents the weight of the dried sample.

9. Process of claim 8 wherein steps (a) to (e) are repeated such that the moisture content of the humidity control substance required for establishing a specific relative humidity of the surrounding atmosphere can be predicted.

10. Process of claim 8 wherein the container of step (b) is equipped with a probe of a hygrometer.

11. Process of claim 8, wherein the a sample of the humidity control substance having a specific moisture content is prepared using a mixing apparatus having a mixing chamber, at a charging level ratio (CL) of from 0.08 to 0.50, wherein CL is the ratio of the volume of the sample of the humidity control substance to the volume of the mixing chamber of the mixing apparatus.

12. Process of claim 1, wherein the amount of water transported to or from the mixing chamber by exchange with the surrounding atmosphere relative to the amount of liquid water added is less than 3%.

* * * * *